United States Patent

[11] 3,522,778

[72] Inventors: William F. Porath
P.O. Box 91, Gillett, Wisconsin 54124;
Milton A. Porath, Route 1, Suring, Wisconsin 54174
[21] Application No.: 814,629
[22] Filed: April 9, 1969
[45] Patented: Aug. 4, 1970
Continuation-in-part of Ser. No. 549,962, May 3, 1966.

[54] GAME TABLE
14 Claims, Drawing Figs.

[52] U.S. Cl. .............................................. 108/153,
273/3, 248/188.1, 248/431
[51] Int. Cl. ................................................... A47b 3/06,
[50] Field of Search.................................. 108/1 to 11:150 to 157; 248/188.1, 431; 273/3.3.1, 3.23.4, 3.3, 3.5, 11

[56] References Cited
UNITED STATES PATENTS

| | | | |
|---|---|---|---|
| 709,661 | 9/1902 | Assorati ................. | 273/3 |
| 3,001,843 | 9/1961 | Davis ....................... | 108/3 |
| 3,180,642 | 4/1965 | Reineman ................ | 108/151XR |
| 3,263,996 | 8/1966 | Braun ...................... | 273/3.4 |
| 3,312,438 | 4/1967 | Goetz, et al .............. | 248/188.1 |
| 3,366,079 | 1/1968 | Koransky, et al ......... | 248/431 |

Primary Examiner— Bobby R. Gay
Assistant Examiner— G.O. Finch
Attorney—Wallenstein, Sprangenberg, Hattis, and Strampel

ABSTRACT: A game table and leg structure therefore for supporting and bracing the same including a plurality or angularly spaced brace members in substantially abutting relation at a central axis of the table and a plurality of angularly spaced legs also in substantially abutting relation with the brace members at or near the central axis of the table. The legs are permanently or detachably secured to the brace members, the removal and replacement of three or more legs being accomplished by a single nut and hub lock plate. When the table is constructed as a pool table, means are provided for permanent bed-leveling to maintain the playing surface in a true flat condition.

U.S. PATENT 3,522,778
GAME TABLE

This is a continuation-in-part of our copending application Serial No. 549,962, filed May 3, 1966.

The principal objects of this invention are to provide an improved game table construction by providing a table leg support structure for receiving supporting legs either permanently or detachably secured to the table support structure and, to provide means for permanent leveling of the table top surface.

Although the table structure of this invention may be used to form tables of various kinds the novel and unique features and aspects of this invention have particular utility in the construction of game tables but is not intended to be limited thereto. One type of game table most advantageously formed by this invention is a pool table which includes a cushion rail assembly, a playing surface and a frame which are hexagonal in configuration and an outwardly facing drink box may be secured to the underside of the frame adjacent each corner thereof, the drink boxes forming convenient places for setting drinks while using the table. The table is constructed to be used either as a pool table or a card table or the like. In accordance with this invention a bracing and leg structure is provided at the underside of the game table and includes a plurality of angularly spaced brace members extending inwardly and downwardly from points adjacent the periphery of the frame to a central axis below the frame, said brace members being directly of indirectly in substantially abutting relation at said central axis. The game table also includes a plurality of angularly spaced legs extending outwardly and downwardly from said central axis below the frame to points below their associated brace members. The legs may be half in number of the bracing members in which case they are secured to alternate ones of the brace members and they are also in substantially abutting relation at the central axis. In one form of this invention the bracing members and the legs are permanently secured to the frame, as by screws for securing the outer ends of the bracing members adjacent the periphery of the base plate or frame, and by a bolt extending along the central axis of the leg structure for securing the inner ends of the brace members and legs to the center of the base plate or frame. In another form of this invention only the bracing members are permanently secured to the frame by screws at the outer ends of the bracing members adjacent the periphery of the base plate or frame and by a bolt extending along the central axis for securing the inner ends of the bracing members. However, in this case the bolt at the central axis is longer than necessary for securing the brace members to provide a downwardly extended threaded portion for receiving a hub lock plate and a nut which securely hold removable legs in position in a region near the central axis of the leg structure. The removable legs and certain brace members are laminated preferably three ply each of uniform thickness, with portions of each leg fitting into and/or about correspondingly fashioned mating portions on the brace members which includes confronting engaging edge surfaces on the brace members and the legs connected thereto, the edge surface being angled along their width and along their length to form a double action wedge lock for the legs to firmly and rigidly support the table top. The legs are maintained firmly locked in position by the angled edge surfaces on the legs brace members, by the hub lock plate and nut and by the weight of the table top, increasing weight causing increasing locking action of the legs. This aspect of the invention is accomplished by providing partially laminated brace members and partially laminated legs members such that exterior laminate portions of the leg members fit on either side of the interior laminate portions of the corresponding brace members the result being a leg and brace structure which has the appearance of being a unitary structure and yet the legs are removable. Thus, all the legs can be removed or replaced by loosening or tightening a single nut, and when the legs are in place and held by the nut and the hub lock plate the table is rigidly supported, a necessary feature for game tables such as pool tables. However, the easily attachable legs facilitate packaging and warehouse storage of such tables, since tables with the legs removed form smaller packages, without placing undue hardships on the purchasers of the tables. That is, the purchasers are not required to expend great time and effort to attach the legs to the tables.

The bracing and leg structure of both the permanents and removable leg types provide a firm and rigid center support for the table top which extends from the center support radially outwardly. As a result, the frame or base plate of the table top can be made relatively thin without danger of distortion or warping and the necessity for deep box-like frames which are outwardly provided with legs and which are currently used in pool game tables or the like is eliminated. Since the firmly and rigidly supported frame is relatively thin and since the bracing members and legs extend radially outwardly from the center of the table, there is adequate room under the table readily to accommodate the legs of persons seated around the table when playing cards or the like on the table. Also, the outer ends of the legs are located within the confines of the frame of the table to provide for adequate "toe" room for persons walking around the table when playing pool or the like thereon.

The bracing and leg structure of this invention is suitable for game tables of any configuration, as for example, circular, oval, rectangular or square, the bracing members and legs extending radially outwardly from the center of the table toward the periphery of the table. Any desired numbers of bracing members and legs may be utilized to form rigid support for the playing surface. For example, in the case of a circular or oval table eight bracing members and four legs may be used, and in the case of a square or rectangular table, such as a six pocket pool table, eight bracing members extending towards the four sides and the four corners of the table and four legs extending toward the four corners of the table may be used. In the form of this invention where a hexagonal frame is utilized, six bracing members extending toward the corners and three legs secured to alternate ones of the bracing members are used.

Another aspect of this invention is the provision of means for permanent bed-leveling of the table top when the table is constructed as a pool table. A plurality of initially deformable shim devices are located about the top surface of a base plate or frame which is to be directly below the table top, the shim devices being formed to provide a plurality of support areas within the same plane of support for the underside of the table top. The initially deformable shim devices are made of individual units of putty-like material which are placed in contact with the base plate, the units of putty-like material being oversized in the vertical direction. Pressure by means of a planar gaging surface is applied to the units of putty-like material to flatten the same so all the top surfaces of the units are in the same plane. The preferred method of applying and forming the shim devices is by using a building table which has a true flat surface. Discrete units of the putty-like material are placed at desired locations on the true flat surface of the building table together with several substantially identically dimensioned non-deformable gaging shims. The base plate is turned upside down and carefully placed over the building table so that desired areas of the base plate come in contact with each of the discrete units of putty-like material and pressure, preferably the weight of the base plate, will flatten the putty-like material to a thickness equal to the thickness of the non-deformable gaging shims. The base plate remains in this condition until the putty-like material hardens and adheres to the base plate thereby forming the shim devices. Therefore, when the flat table top, as for example a pool table top, rests upon the base plate it is supported by a plurality of rigid planar contact areas. Most advantageously, elongated units of the putty-like material are placed in registry with certain bracing members located on the opposite side of the base plate and as such have the effect of extending the bracing members through the base plate for improved support of the table top.

Further objects of this invention reside in the details of construction of the game table and in the cooperative relationships between the components parts thereof.

Other objects and advantages of this invention will become apparent to those skilled in the art upon reference to the accompanying specification, claims and drawings in which:

FIG. 1 is a perspective view of one form of game table, which utilize the features of this invention, looking from above the game table and showing the cushion rail assembly in place on the table;

FIG. 2 is a perspective view similar to FIG. 1 but illustrating the cushion rail assembly removed so that the game table may be utilized as a card table or the like;

FIG. 3 is a perspective view similar to FIGS. 1 and 2 but showing the cushion rail assembly and the playing surface removed so that the interior construction of the frame may be seen;

FIG. 4 is a perspective view of the game table of FIGS. 1, 2 and 3 but looking from below the game table to show more clearly the construction of the bracing and leg structure;

FIG. 5 is a perspective view similar to FIG. 1 but illustrating a modification of this form of the game table;

Figures 1, 2, 3, 4, 5:
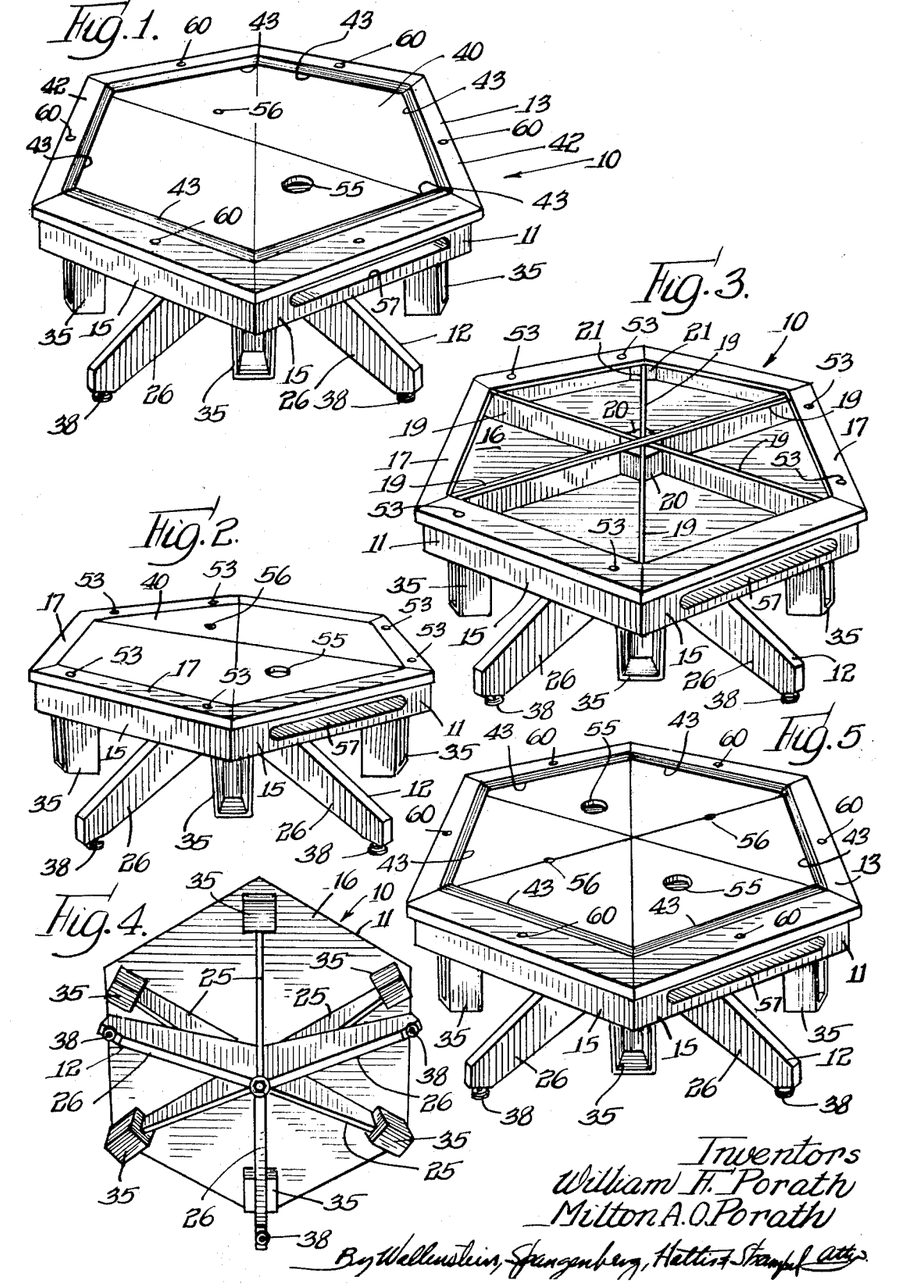

Referring now to FIG. 1 a game table constructed in accordance with this invention is designated generally by reference numeral 10. It includes a frame 11 which may be of any desired configuration but which is illustrated as a hexagonal frame, a bracing and leg structure 12 and a removable cushion rail assembly 13, the cushion rail assembly being shown in place in FIG. 1 and removed in FIG. 2.

Figure 6:
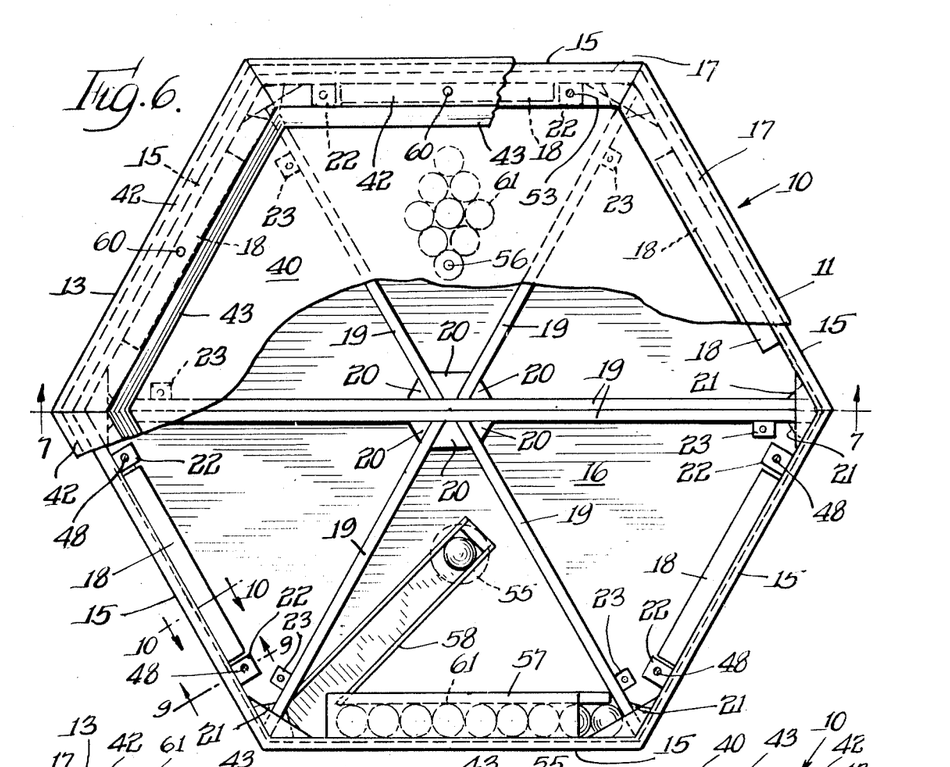
FIG. 6 is a top plan view of the game table illustrated in FIG. 1 with portions of the cushion rail assembly and portions of the playing surface and frame omitted to show the relationships between the cushion rail assembly, the playing surface and the construction of the frame.
Figure 7:
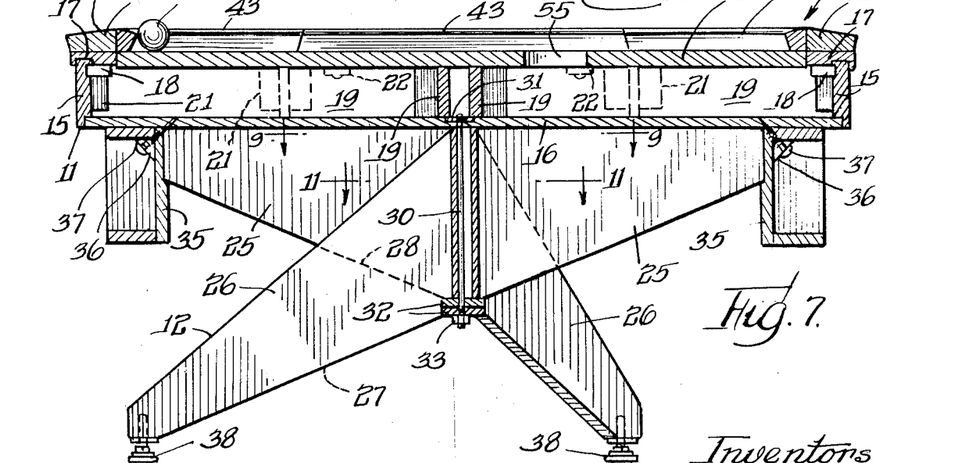
FIG. 7 is a sectional view taken substantially along the line 7-7 of FIG. 6.

While the frame 11 may be in the form of a single base plate or the like, the preferred construction of the frame 11 is illustrated in more detail in FIGS. 3, 6 and 7. The frame includes six sides 15 which are suitably secured as by glue at their bottom edges to a hexagonal base member 16. A hexagonal border member 17 is secured, as by glue, to the top edges of the sides 15 and it is reinforced by reinforcing members 18, best seen in FIG. 6, suitably secured thereto and to the sides 15 by glue or the like. A plurality of reinforcing struts 19 extend from the center of the table to the corners of the frame, they being suitably secured together at the center by glue blocks 20 and secured to the corners where the sides 15 meet by glue blocks 21. These struts 19 are also preferably secured to the base member 16. In this way, a rigid frame is provided for supporting the playing surface of this form of game table, the frame being relatively thin, i.e. very little depth. A pair of fastener guide blocks 22 are suitably secured, as by glue, to each of three sides 15 of the frame for the purpose of removably securing in place the cushion rail assembly. Also fastener guide blocks 23 are suitably secured, as by glue, to the struts 19 to provide means for fastening the playing surface to the frame.

Figures 8, 9, 10, 11, 12, 13, 14:
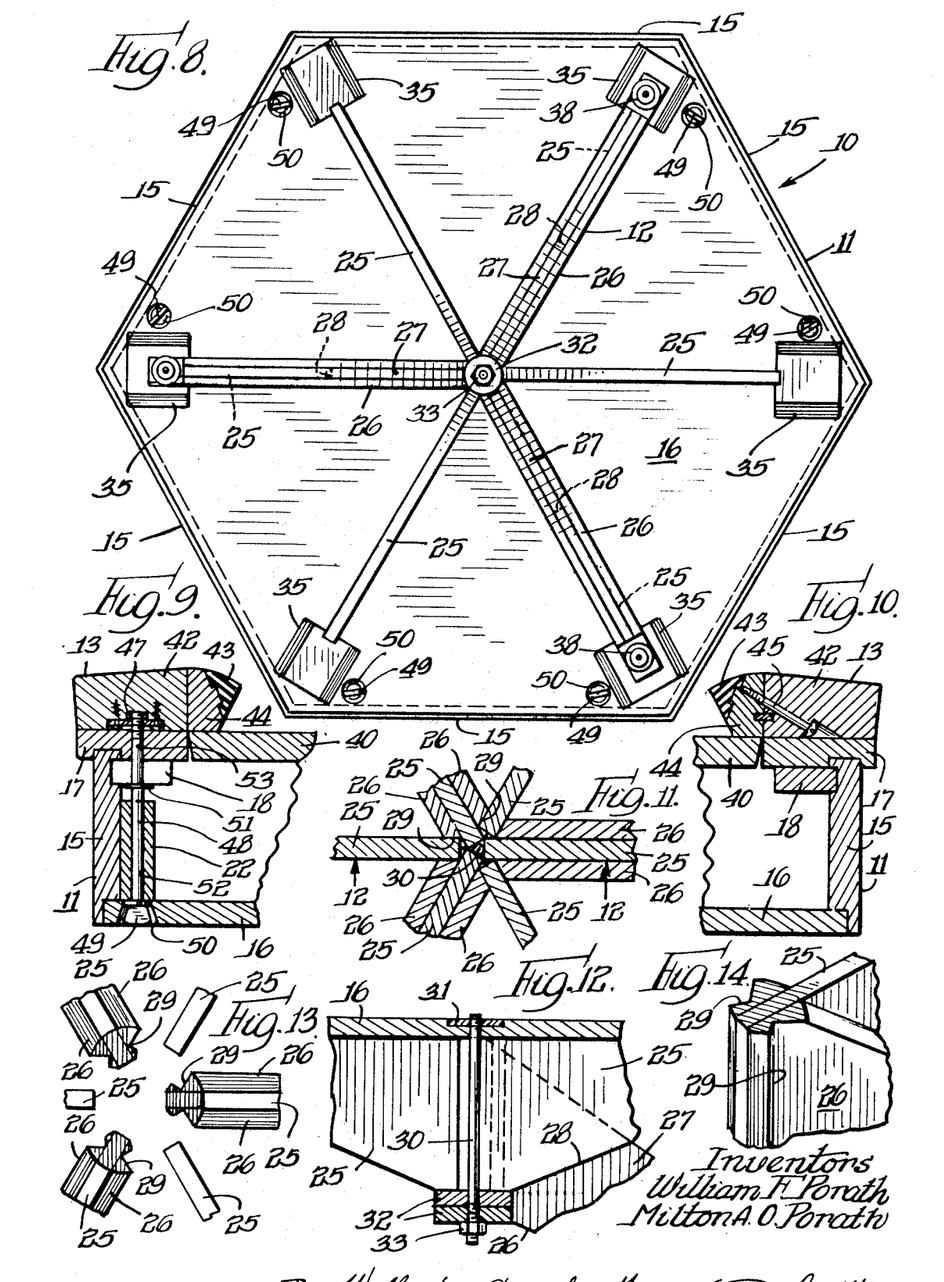
FIGURE 8 is a bottom plan view of the game table illustrated in FIGS 1 through 6.
FIG. 9 is a partial enlarged vertical sectional view taken substantially along the line 9-9 of FIG. 6 but with the cushion rail shown.
FIG. 10 is an enlarged partial sectional view taken substantially along the line 10-10 of FIG. 6 but with the cushion rail shown.
FIG. 11 is an enlarged partial sectional view taken substantially along the line 11-11 of FIG. 7.
FIG. 12 is an enlarged partial sectional view taken substantially along the line 12-12 of FIG. 11.
FIG. 13 is an exploded partial view of the bracing and leg structure illustrated in FIGS. 11 and 12.
FIG. 14 is a perspective view of a portion of the leg structure illustrated in FIGS. 11, 12, and 13.

The bracing and leg structure 12, which supports the hexagonal frame 11, includes six brace members 25 which extend from points adjacent to the corners of the frame 11 to the center of the frame 11. This bracing and leg structure 12 also includes three legs 26 which extend from points below alternate corners of the frame to the center of the frame. Each of these legs 26 is a laminate construction including two outer layers overlying their associated bracing members 25 and a filler member 27 of the same thickness as the bracing member 25 which extends from the line 28 to the lower ends of the legs as seen in FIG. 12. The outer layers of the legs 26 are suitably secured, as by glue or the like, to the associated bracing member 25 and filler member 27 to form an integral construction. The inner ends of the legs, as illustrated in FIGS. 11, 13, and 14, are provided with notches 29 for receiving adjacent bracing members 25 so that when the bracing members 25 and legs 26 are all brought together at the center of the table along a vertical center line they closely fit together in a nested arrangement as illustrated in FIG. 11. A stud or bolt 30 extends vertically along the vertical center line of the table and is secured at its upper end to a metal washer 31 which is sunk into the upper surface of the base member 16 of the frame. A plurality of washers 32 extend into recesses in the legs 26 and a nut 33 threaded on the stud or bolt 30 operates to securely hold the inner ends of the bracing members 25 and legs 26 together and to the center of the base member 16 of the frame 11. This construction thus provides a permanent leg structure in accordance with this invention.

Six drink boxes which are adapted to hold drinks placed therein during use of the game table are secured, as by glue or the like, to the outer ends of the brace members 25, these drink boxes 35 being arranged under the corners of the hexagonal frame 11. Screws 37 extending through glue blocks 36 in the drink boxes into the bottom member 16 secure the drink boxes 35 and the outer ends of the bracing members 25 to the bottom member 16 of the frame 11 adjacent to the corners of the frame. The bottom and outer ends of the three legs 26 are each provided with a leveling device 38 so that the game table may be readily leveled for use.

A playing surface 40 which is of hexagonal configuration where the frame 11 is hexagonal as illustrated herein fits upon the struts 19 of the frame within the border members 17 and is substantially flush with the border members. The playing surface 40 may be secured to the struts 19 by the guide blocks 23. The playing surface 40 may be formed of any suitable material upon which pool may be played, as for example, slate or the like, and the upper side of the playing surface 40 may be provided with the usual felt or the like which is normally utilized for the playing surface on a pool table.

The removable cushion rail assembly 13 preferably includes six straight mitered members 42 suitably secured together to form a hexagonal assembly and as shown in FIGS. 9 and 10, the six members 42 are provided with six equal and inwardly facing straight resilient cushions 43 which are secured to backing members 44. The resilient cushions 43 and their backing members 44 are secured to the members 42 of the cushion rail assembly 13 by screws 45 as illustrated in FIG. 10

The resilient cushions 43 are arranged above the playing surface 40 and face inwardly toward the center of the playing surface.

As expressed above, the cushion rail assembly is removably carried by the frame 11 and towards this end three sides of the cushion rail assembly are recessed and provided with downwardly facing nuts 47 (FIG. 9) held in place by screws or the like. Bolts 48 extend through holes 52 in the blocks 22 and holes 53 in the border members 17 and are adapted to be screwed into the nuts 47 for removably securing the cushion rail assembly 13 in place on the table. The lower end of the bolts 48 are provided with wings 49 received in enlarged holes 50 in the base member 16 for rotating the bolts 48 for securing and releasing the cushion rail assembly 13. Snap rings 51 are carried by the bolts 48 to prevent them from dropping out of the blocks 22 when the cushion rail assembly is released.

The cushion rail assembly 13 in cooperation with the playing surface 40 define six equal triangular sectors extending from the center of the playing surface to the inwardly facing straight resilient cushions 43. In the form of the invention illustrated in FIG. 1 a pocket 55 is centrally located in one of these sectors of the playing surface substantially midway between the center of the playing surface and the inwardly facing straight resilient cushion 43 of that sector for receiving pool balls 61 played on the playing surface 40 within the hexagonal cushion rail assembly 13. A side 15 of the frame 11, which is preferably the side containing the sector which has the pocket 55, is provided with an outwardly opening pool ball collecting through 57 and a chute 58 extending from beneath the pocket 55 operates to convey pool balls from the pocket 55 in the playing surface to the ball collecting through 57, thereby providing an automatic return for the pool balls.

In the form of the invention illustrated in FIG. 1 wherein a single pocket 55 is provided in one sector of the playing surface, a spot 56 is centrally located in the triangular sector of the playing surface opposite the sector having the pocket 55 therein and this spot 56 is also preferably arranged substantially midway between the center of the playing surface and the inwardly facing straight resilient cushion of that sector for racking pool balls 61 in that sector as illustrated in FIG. 6. The cushion rail assembly 13 is preferably provided with reference spots 60 substantially midway of each straight resilient cushion 43 thereof to facilitate calculations of the angles in playing pool on the game table. The unusual and beneficial results flowing from the angular relationships between the six inwardly facing straight resilient cushions 43 and the positional relationships between the pocket 55 and spot 56 and the cushions 43 are set forth in our copending application Serial No, 549,962, filed May 3, 1966 and need not be repeated here.

In the other form of the game table illustrated in FIG. 5, two pockets 55 are provided in the playing surface instead of one as in the form of the game table illustrated in FIG. 1. Here, the pockets 55 are arranged in opposite sectors of the playing surface and each pocket is arranged substantially midway between the center of the playing surface and the inwardly facing straight resilient cushion 43 of the sector in which that pocket is located. Here, two spots for racking the balls are preferably used and these spots are located at the adjacent boundaries of the other pairs of sectors.

When the cushion rail assembly 13 is removed from the game table so that the game table can be used as a card table or the like, the pocket 55 may be covered with a suitable cover (not shown) so as to prevent dropping of cards or other articles into the pocket 55. Alternatively, a flat cover may be positioned over the cushion rail assembly to provide a flat top surface for playing cards or the like. The drink boxes are conveniently available for receiving drinks set therein regardless of whether the game table is set up for playing pool or for playing cards or the like. The pocket 55 is made somewhat larger than the pool balls 61 so that when a pool ball is played into the pocket 55, it rapidly disappears therein so as not to obstruct another pool ball from closely following and dropping into the pocket.

Figures 15, 16:
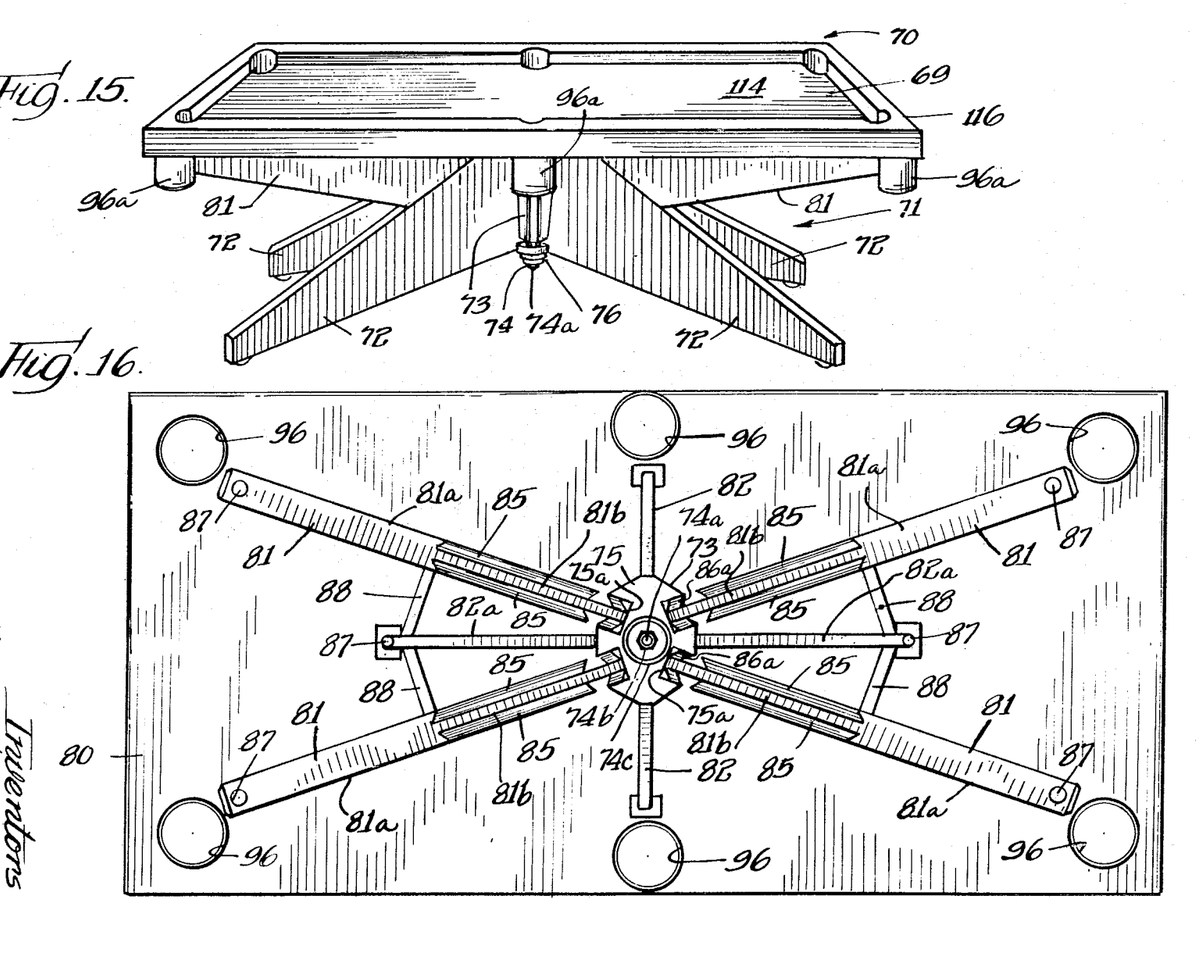
FIG. 15 is a perspective view of an alternate form of game table constructed in accordance with this invention.
FIG. 16 is a bottom view of the table FIG. 15 showing the understructure of the brace members with the legs removed.

Referring now to FIG. 15 there is illustrated a conventional rectangular six-pocket pool table also constructed having bracing members and legs fashioned in accordance with this invention and is designed generally by reference numeral 70. The pool table 70 has a brace and leg structure 71 similar to that shown with respect to the pool table of FIG. 1 here the novel difference being that the brace and leg structure 71 has a plurality of legs 72 which are detachably secured to a center hub 73 of the brace and leg structure 71 by means of a single center nut and bolt 74 and 74a respectively and a hub lock plate 76. The table 70 can be partially broken-down to form a smaller package for shipment and warehouse storage and can be quickly and easily assembled by connecting the legs 72 to the brace and leg structure 71 and locking the legs in place by the single nut 74 and the hub lock plate 76 thus providing rigid support for the table top 69.

Figures 17, 20, 21:
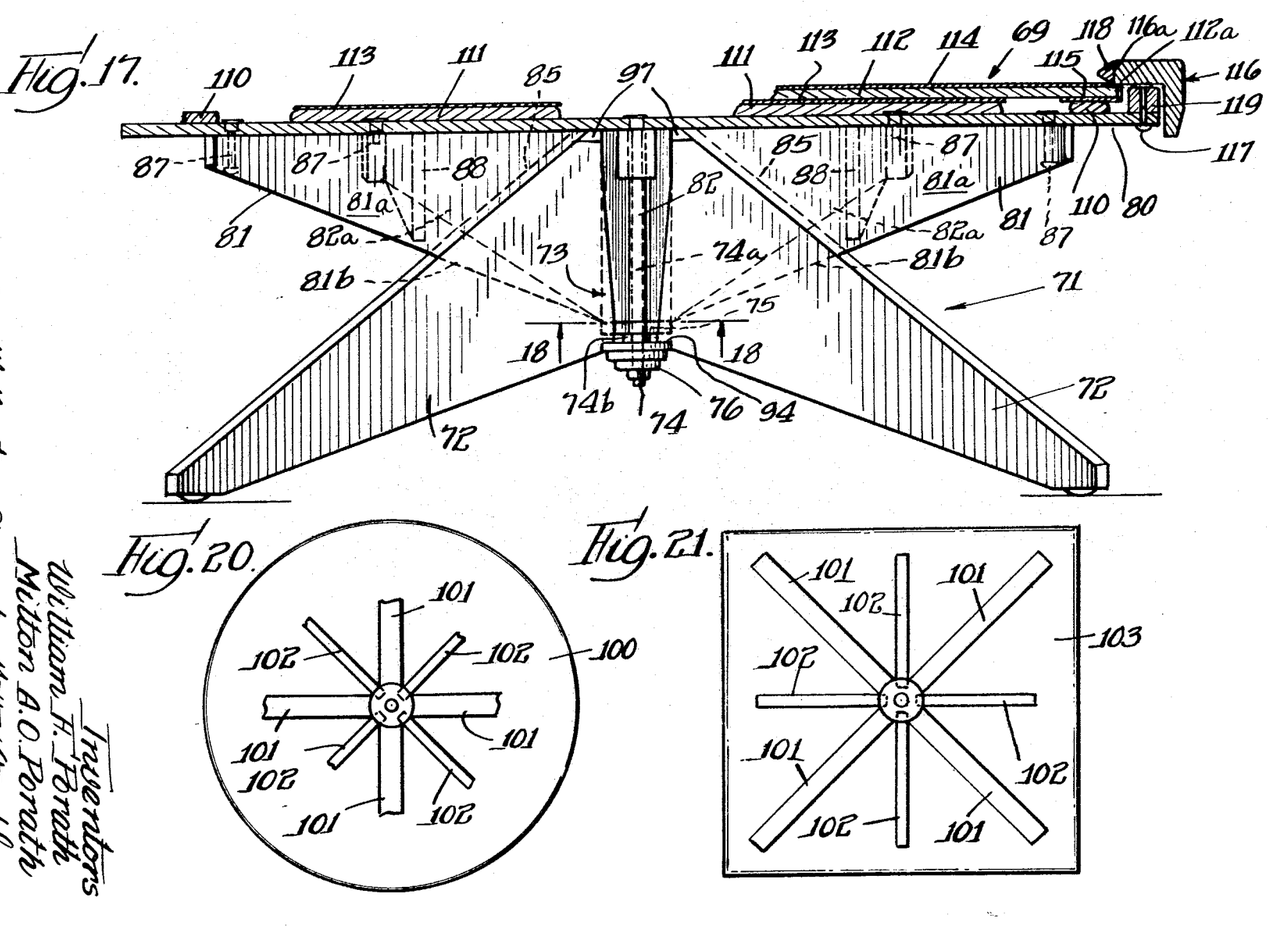
FIG. 17 is a side elevational view of the table of FIG. 15 with the table top shown in section and the legs shown locked in position.
FIG. 20 illustrates an alternate form of table construction utilizing the features of this invention.
FIG. 21 illustrates still another alternate form of table construction utilizing the features of this invention.
Figure 18:
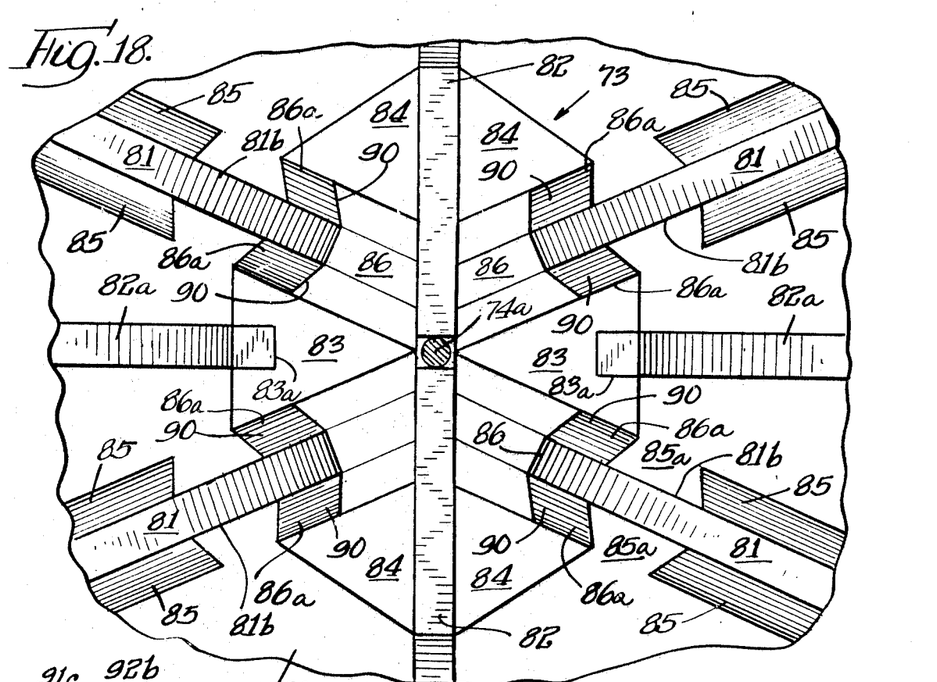
FIG. 18 is an enlarged cross-sectional view of the center hub of the table shown in FIGS. 15, 16, and 17 and is taken substantially along line 18-18 of FIG. 17.

For a better understanding of the detachable leg aspect of this invention reference is now made to FIGS. 16, 17, 18 and 19 which show the detailed features of construction by which many of the advantages of this invention are obtained. The table 70 includes a base plate 80 which is preferably a sheet of plywood for receiving at the underside thereof a plurality of angularly spaced partially laminated brace members 81 which have the lower edges thereof angled downwardly from a peripheral region of the base plate 80 to the center hub 73, each of the brace members 81 being substantially in abutting relation with center hub 73 such that portions of the brace members 81 form part of the center hub. Brace members 82 extend tranversely of the base plate 80 and terminate in abutting relation with the bolt 74a, as best seen in FIG. 18. Additionally, brace members 82a extend longitudinally of the base plate 80 and in effect terminate in abutting or near abutting relation with the bolt 74a through filler blocks 83. Here the base plate 80 serves as the frame of the table top 69. Preferably, the brace members 81 are partial laminate structures of triple thickness of boards in the outer regions 81a with only the single thickness extending inwardly and downwardly at 81b and terminating in abutting relation with corresponding brace members 82 near the bolt 74a. The inwardly and downwardly facing edges 85 of the outer laminate sheets in the region 81b are angled in two directions, one angled direction beginning at an intermediate point on the brace member 81 and angling upward toward the top region of the center hub 73 and the other angled direction being slanted inwardly toward the center sheet of the brace member.

The pair of V-shaped filler blocks 83 are provided between the acute angle sides of the brace members 81 and are conveniently notched at 83a to receive the ends of the alternate brace members 82a therein, the V-shaped filler blocks 83 extending vertically substantially the entire vertical extent of the central portions of the brace members 81 to form part of center hub 73. Additionally, a plurality of V-shaped filler blocks 84 are positioned between adjacent surfaces of the brace members 81 and 82, to form another part of the center hub 73, it being understood that all of the brace members are in substantial abutting relation one with the other either directly or indirectly through certain ones of the filler blocks or through portions of other brace members. Here, the brace members 81 are provided with enlarged end portions 86 which are preferably of laminate construction, as best seen in FIG. 18, with doubled angled edge surfaces 86a one angle diverging upwardly from the central axis of the hub 73 and the other angles being the slanted edge surface of the side pieces which form the laminate enlarged end portions 86. The effective abutting relation of the brace members is maintained very close to the center bolt 74a which, together with a permanent lock plate 75 and a permanent lock plate nut 74b, aids in supporting the central ends of the brace members to the center region of the base plate 80 as will be described in more detail hereinbelow. The filler blocks 83 and 84 together with the enlarged width portions 86 of the brace members 81 are securely fastened together by suitable means such as nails screws and/or glue and the entire center structure is supported at the center of the base plate 80 by the center bolt 74a, nut 74b and the permanent lock plate 75, a washer 74c being provided between the permanent lock plate 75 and the nut 74b. Also the permanent lock plate 75 may be nailed to the various filler blocks and brace members glue being used if desired, and radially outward portions of the brace members are fastened at other regions of the base plate 80 by means of a plurality of bolts 87. A plurality of stabilizing braces 88 may be provided between the end portion of the brace members 81 for added rigidity. The doubled angled edge surfaces 86a are displaced inwardly with respect to the filler blocks 83 and 84 thus forming notches 90 in the center hub 73 on either side of the center portions 81b of the brace members 81, and correspondingly angled end portions of the legs fit into the notches 90 as will be described in more detail hereinbelow.

Figure 19:
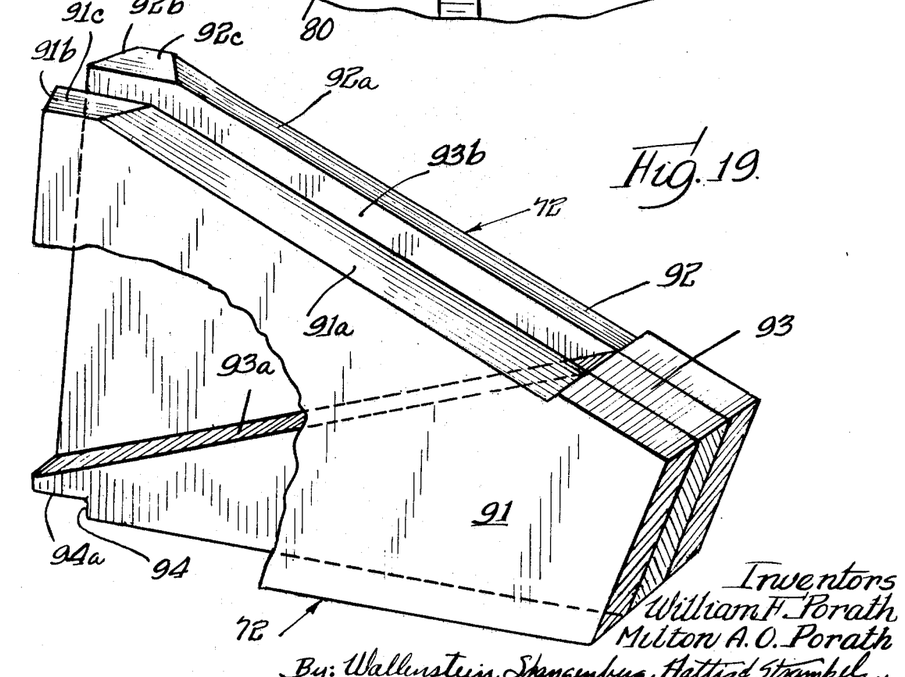
FIG. 19 is a fragmentary view of a removable leg constructed in accordance with this invention with parts broken away.

Referring now to FIG. 19 there is seen a fragmentary view of the innermost or hub engaging portion of one leg 72 with parts broken away to more clearly illustrate the construction of the leg. The leg 72 is formed by a pair of side plates 91 and 92 spaced apart by a filler member 93 which is of substantially the same thickness as the center portion 81b of the brace members 81 located near the center hub 73 such that the side plates 91 and 92 embrace and snugly fit on either side of the portion 81b when the leg 72 is placed and locked in position. The side plates 91 and 92 have doubled angled edge surfaces 91a and 92a which are fashioned to matingly engage the corresponding double angled edge surfaces 85 on one of the brace members 81. Also, the side plates 91 and 92 have almost vertical double angled edge surfaces 91b and 92b respectively which are also fashioned to matingly engage the corresponding double angled edge surfaces 86a formed within the center hub 73 on either side of the center portions 81b of one of the brace members. The legs 72 are each fashioned sufficiently similar in size and maintained within suitable tolerances such that any one of the legs 72 will properly fit onto any one of the brace members 81.

To better understand how the legs 72 fit onto the brace members 81 the following explanation is given by way of example with reference to FIGS. 18 and 19. Although the permanent lock plate 75 is not shown in FIG. 18 it will not detract from an understanding of the operation which follows. As mentioned hereinabove, FIG. 18 is an enlarged bottom view of the center hub 73 showing the central portions of the brace members 81 as taken along line 18-18 of FIG. 17. Reference will be made to the lower right-hand brace member 81 as viewed in FIG. 18. To place the leg 72, of FIG. 19 onto this lower right-hand brace member 81 the leg will be rotated through 90 degrees with the bottom portion of the leg 72 being moved toward the viewer and the top portion of this leg 72 being moved away from the viewer so as to place the leg 72 in a similar upside down condition as are the brace members 81 of FIG. 18. The small flat ends 91c and 92c of the side plates 91 and 92 are placed in registry with the open areas 85a on either side of the center portion of the lower right-hand brace member 81. The leg 72 is then lowered into position so that the slot 93b of the leg 72 will receive the center portion 81b of the brace member 81 and the spaced apart portion of the side plate 91 and 92 will be on opposite sides thereof. With the leg 72 fully in position the double angled edges 91a, 92a, 91b and 92b of the leg will matingly engage the corresponding double angle edges 85 and 86a to wedgingly lock the leg in position. However, preferably the small flat ends 91c and 92c of of the leg 72 do not engage the under surface of the base plate 80 in the region 85a but rather a space 97 is maintained therebetween, as seen in FIG. 17. This insures that the mating double angled edge surfaces of the leg and brace member fit snugly together.

As seen in FIG. 16, the permanent lock plate 75 has notches at 75a to provide clearance for the legs 72. The legs 72 are fashioned so that the center hub engaging portion of the legs are somewhat longer than the center hub 73 and extend slightly below the permanent lock plate 75, as best seen in FIG. 17. Each leg 72 is provided with a notch 94 which is located at the center hub 73 when the legs are in position on the brace members 81 and the horizontal surface 94a of the notch 94 is slightly below the surface of the permanent lock plate 75 so that the removable lock plate 76 will fit into the notches 94 of the legs 72 and the nut 74 will securely lock the legs in position. The legs are quickly and easily removed by removing the single nut 74 and lock plate 76.

When the table top 69 is fashioned as a rectangular six-pocket pool table, the base plate 80 is provided with a plurality of aperatures 96 through which suitable pocket devices extend for receiving billiard balls therein. Although the detachable leg structure of this invention is shown in particular detail with regard to a game table of this type it is not intended to be limited thereto as this leg structure has great versatility and utility for supporting table tops of various kinds, sizes and shapes. For example, FIG. 20 illustrates diagrammatically the underside of a round table structure 100 which includes a plurality of angularly spaced support legs 101 which are spaced apart 90 degrees one from the other and over corresponding brace members with alternate brace members 102 positioned between each of the legs. Additionally, the leg structure of this invention may be used to support a square table structure 103 as illustrated diagrammatically in FIG. 21, or a small rectangular table such as that used for supporting a bumper pool game surface.

Another aspect of this invention is the provision of means for permanent bed leveling of the pool table top 69, or any other table top requiring bed leveling. Here, a plurality of initially deformable circular shim devices 110 are placed about the top surface of the base plate 80 near the periphery thereof together with elongated shim devices 111 of the same type of material, the uppermost surface of each shim device being in the same plane to provide a plurality of support contact areas for a rigid pool table bed 112, as best seen in FIG. 17. Since the base plate 80 is of plywood or other similar material, which is considered for most purposes a flat sheet with the surfaces thereof in the same plane, it is in fact not sufficiently flat to accurately support a pool table bed in the desired true horizontal condition such that there are no inclined surface areas on the playing field to affect the true rolling action of balls placed thereon. To overcome the inherent inaccuracies and nonuniformity of the base plate 80, the shim device 110 and 111 are placed about the top surface of the base plate 80 in a most advantageous manner with the circular shim devices 110 spaced apart along the near peripheral region to the base plate 80 while the elongated shim devices 111 are positioned on the base plate so as to be substantially directly over the brace members 81 and in effect are extensions of such brace members. This arrangement of positioning the shim devices is preferred since it provides an accurate and rigid multi-point planar support for a pool table bed 112 to give the pool table 70 a quality of excellence required of commercial and professional pool tables.

As mentioned hereinabove the shim devices 110 and 111 are initially deformable devices made of a putty-like material and are placed in contact with the base plate 80 in an oversized condition in the vertical direction and thereafter subjected to pressure by a true planar gauging surface to flatten the putty-like material so as to have the top surfaces of each flattened shim device in the same plane regardless of the deformity of the base plate 80. The putty-like material then hardens and adheres to the base plate 80 thus forming shims of the desired thickness. During the manufacture of the pool table 70 the brace member and filler blocks of the center hub 73 are secured to the underside of the base plate 80 and thereafter quantities of the putty-like material are placed at desired locations on a building table, not shown, which is a true planar surface, and the base plate 80 is then turned over and placed on the building table in contact with the units of putty-like material. Undeformable shims are also placed on the building table as a guide to determine the extent the putty-like material will be flattened. The undeformable shims are substantially exactly of the same dimension and preferably three in number with two being positioned at one end of the building table and one positioned at the other end of the building table. When the base plate 80 is placed upside down on the building table to come in contact with the units of putty-like material, it will settle downwardly by its own weight to flatten the putty-like material the settling continuing until the base plate 80 comes in contact with the three undeformable shims. The base plate 80 remains in this position until the putty-like material cures or hardens to form the shims 110 and 111.

After the shim devices 110 and 111 are formed on the base plate 80 the elongated shims 111 are covered with a single layer of cloth 113 which is of the same kind of material, the same thickness and compressibility, as a cover cloth 114 which is stretched over the pool table bed 112. The cover cloth 114 is folded under to engage and rest upon the shim device 110 as indicated by reference numeral 115. That is, if the cover cloth 114 is made of the traditional green felt then so also are the layers of cloth 113. This ensures uniformity of spacing between the shim devices 110 and 111 and the underside of the pool table bed 112.

When the pool table bed 112 is in position on the base plate 80, a bumper rail assembly 116 is secured to the periphery of the base plate by means of a plurality of bolts 117. The bumper rail assembly 116 includes a plurality of inwardly facing straight edge resilient members 118. A plurality of spacer bolt blocks 119 are provided about the periphery of the base plate 80 for receiving the bolts 117 and to provide a stop rest upon which at least portions of the bumper rail assembly rest. In the preferred form of this aspect of the invention the spacer bolts 119 have a vertical extent that is less than the vertical extent of the uppermost surface of the pool table bed 112 and the horizontal portion 116a of the bumper rail assembly 116 extends inwardly a sufficient distance to engage a marginal edge portion 112a of the bed 112 and clamp the marginal edge portion to rigidly hold the bed 112 in position.

Accordingly, it will be understood that variations and modifications of this invention may be effected without departing from the spirit and scope of the appended claims.

We claim:

1. A game table comprising a frame, a playing surface on said frame, and a bracing and leg structure underneath the frame for bracing and supporting the same including a plurality of angularly spaced brace members extending inwardly and downwardly from points adjacent the periphery of the frame to a central axis below the frame, said brace members being in substantially abutting relation at said central axis, a plurality of angularly spaced legs extending outwardly and downwardly from said central axis below the frame to points below said brace members, said legs being secured to selected ones of said brace members and also being in substantially abutting relation at said central axis, and means for securing said brace members and supporting legs to said frame.

2. A game table as defined in claim 1 wherein the outer and bottom ends of said legs are provided with leveling means.

3. A game table as defined in claim 1 wherein said means for securing said brace members and supporting legs to said frame comprise means including screws for securing the outer ends of the brace members to the frame adjacent the periphery thereof, and means including a bolt extending along said central axis for securing the inner ends of said brace members and legs to the center of the frame.

4. A game table as defined in claim 1 wherein said legs are half in number of said brace members and being secured to alternate ones of said brace members.

5. A game table as defined in claim 1 wherein said frame is hexagonal, said brace members are six in number and extend inwardly and downwardly from points adjacent the corners of said frame, and said legs are three in number.

6. A game table as defined in claim 1 wherein said frame is four cornered, said brace members are eight in number and extending inwardly and downwardly from points adjacent the corners and sides of said frame, and said legs are four in number extending toward the four corners of said frame.

7. A game table as defined in claim 1 wherein said frame is round, said brace members are eight in number and extending inwardly and downwardly from spaced apart points adjacent the peripheral region of said frame, and said legs are four in number extending toward the peripheral region of said frame along every other one of said brace members.

8. A game table as defined in claim 1 wherein said means for securing said brace members and supporting legs to said frame comprise means including a bolt extending along said central axis for securing the inner ends of said brace members, said bolt having a downwardly extended threaded portion for receiving a nut, and lock means cooperable with said extended threaded portion and said nut for detachably securing said legs in abutting relation with said brace member at said central axis.

9. A game table as defined in claim 1 further including a plurality of elongated filler members V-shaped in the cross section and conformably angled to fit within the apex formed between adjacent ones of said brace members and said legs to form a central hub extending downwardly from said frame.

10. A game table as defined in claim 1 wherein said means for securing said brace member and supporting legs to said frame comprise means including a bolt extending along said central axis for securing the inner ends of said brace members, said bolt having a downwardly extended threaded portion for receiving a nut, lock means cooperable with said extended threaded portion and said nut for detachably securing said legs in abutting relation with said brace member at said central axis, and further including a plurality of elongated filler members V-shaped in cross sections and conformably angled to fit within the apex formed between adjacent ones of said brace members and said legs to form a central hub extending downwardly from said frame, said filler members being fixedly secured to said brace members but not to said legs.

11. A game table as defined in claim 1 wherein certain ones of said brace members are partial laminate structures of triple layers each of uniform thickness with a leg receiving region extending from near said central axis to a point intermediate said certain ones of said brace members, said leg receiving region being formed by the absence of a portion of at least one of the triple layers; said legs being a partial laminate structure of triple layers each of uniform thickness with a brace receiving region formed by the absence of a portion of at least one of the triple layers, the absence of laminate portion of said legs conforming to the presence of laminate portion of said brace members and the absence of laminate portion of said brace members conforming to the presence of laminate portion of said legs, the brace members and legs being interlocked in these regions, a locking plate engaging the innermost lower part of said legs, and means for securing said locking plate to detachable secure said legs in position.

12. A game table as defined in claim 1 wherein said frame includes a base plate upon which a true flat top is positioned, a plurality of initially deformable shim devices placed at various location on the upper surface of said base plate, said initally deformable shims being flattened and set to a rigid condition with the uppermost surface of each shim device being substantially in the same plane to provide a plurality of discrete planar support areas for the top.

13. A game table as defined in claim 12 wherein said initially deformable shim devices include circular shim devices positioned about the peripheral region of said base plate and elongated shim devices positioned in registry with certain ones of said brace members so as to be in effect extensions thereof.

14. A game table comprising a frame; a playing surface on said frame; and a bracing and leg structure underneath the frame for bracing and supporting the same including a plurality of angularly spaced brace members extending inwardly and downwardly from points adjacent the periphery of the frame to a central axis below the frame, said brace members being in substantially abutting relation at said central axis; a plurality of angularly spaced legs extending outwardly and downwardly from said central axis below the frame to points below said brace members, said legs being secured to selected ones of said brace members and also being in substantially abutting relation at said central axis; and means for securing said brace members and supporting legs to said frame; said selected ones of said brace members have laminate portions 81a defining double angled edge surfaces 85 on opposite sides of leg receiving portions 81b and laminate portions 86 defining double angled edge surfaces 86a on opposite sides of leg receiving portions 81b; each of said legs being a laminate structure comprising a pair of outer side members 91 and 92 spaced apart by a filler member 93, said filler member 93 being only in the region below the corresponding brace member such that the remainder of said outer side members 91 and 92 embrace each side of said leg receiving portions 81b, said side members 91 and 92 including double angled edge surfaces 91a and 92a for matingly engaging said double angled edges surfaces 85 and having double angled edge surfaces 91b and 92b for matingly engaging said double angled edges 86a; and wherein said means for securing said brace members and said legs to said frame comprise means including a bolt 74a extending along said central axis for securing the inner ends of said brace members, said bolt having downwardly extended threaded portion for receiving a nut 74 and a removable base plate 76 apertured to fit over said downwardly extended threaded portion of said bolt to underlie the mating edge surfaces 86a and 91b, 92b of said laminate portion 86 and said outer side members 91 and 92 to lock said legs in position.